W. P. THOMSON.
INSULATED RAIL JOINT.
APPLICATION FILED DEC. 23, 1914.
1,135,862.
Patented Apr. 13, 1915.
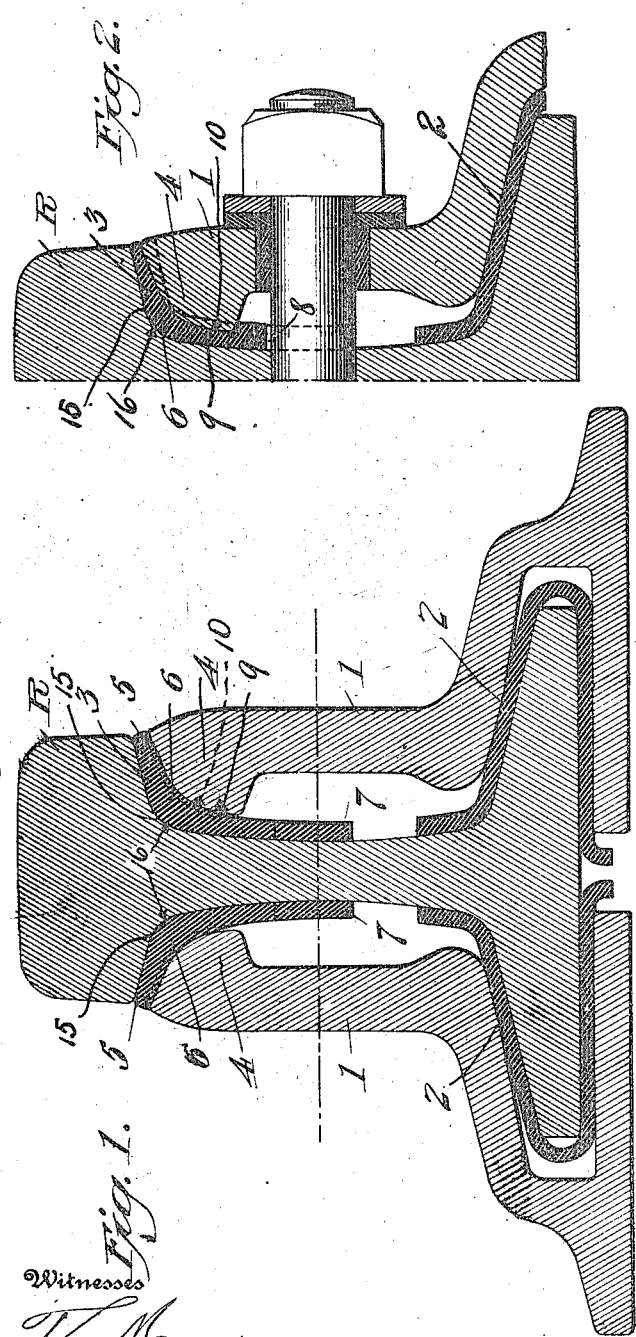
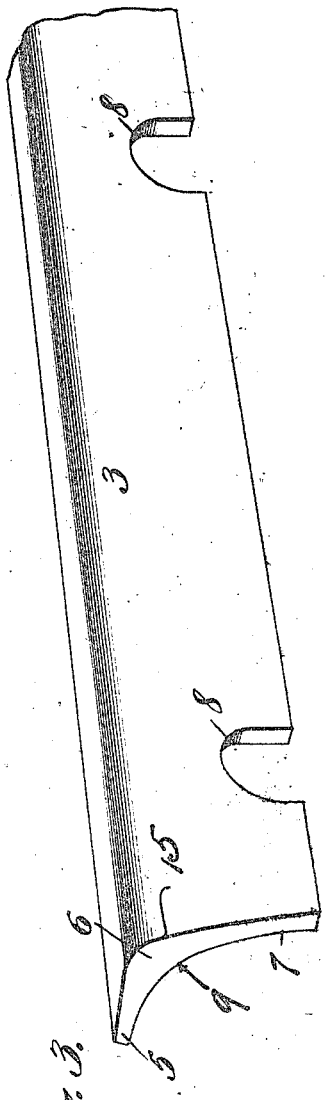
Inventor
William P. Thomson

UNITED STATES PATENT OFFICE.

WILLIAM P. THOMSON, OF NEW YORK, N. Y., ASSIGNOR TO THE RAIL JOINT COMPANY, OF NEW YORK, N. Y., A CORPORATION OF NEW YORK.

INSULATED RAIL-JOINT.

1,135,862.

Specification of Letters Patent.

Patented Apr. 13, 1915.

Application filed December 23, 1914. Serial No. 878,713.

*To all whom it may concern:*

Be it known that I, WILLIAM P. THOMSON, a citizen of the United States, residing at New York, in the county of New York and State of New York, have invented certain new and useful Improvements in Insulated Rail-Joints, of which the following is a specification.

This invention relates to rail joints of the insulated type, and particularly to a novel and practical improvement in the insulating means and the holding or clamping means therefor.

Primarily, the invention has in view an improvement in the structural form of the binding means and insulating means employed in insulated rail joints whereby the insulating material may be utilized to provide the most economical conditions for maintenance and renewal.

In carrying forward this general object, the invention contemplates a construction wherein that part of the insulation subject to the most rapid disintegration and destruction is not only conserved and its life increased, but also possesses the characteristics of being readily removable and replaceable.

Furthermore, another practical object in view is to effect a novel combination between the contact and insulation bearing surfaces of the rail head and of the splice bar, whereby the pressure imposed on the insulation results in greatly reducing the destructive forces of t. affic conditions.

Accordingly, a distinctive object of the present invention is to improve the rail joint head construction and the rail head insulation so that such insulation may more successfully resist the destructive forces incident to the pounding of the car wheels on the rail ends as well as to the tightening of the joint bolts. In the latter connection, the invention provides a novel combination between the rail head insulation bearing and the splice bar insulation bearing whereby upon tightening of the bolts the insulation will be prevented from spreading or mashing out beneath the rail head as it frequently does in the constructions in common use.

With these and other objects in view which will be recognized by those familiar with this art, the invention consists in the novel construction, combination, and arrangement of parts hereinafter more fully described, illustrated, and claimed.

Though susceptible of structural modification, and also to different adaptations in connection with different forms of splices, certain preferred and practical embodiments of the invention are shown in the accompanying drawings, in which—

Figure 1 is a cross sectional view of an insulated rail joint illustrating the application of the improved rail joint head conformation and rail head insulation to a rail joint of the continuous type. Fig. 2 is a similar bisected view illustrating the application of the improvement to a rail joint having an angle bar splice with improved head conformation and using the ordinary insulation having uniform thickness throughout. Fig. 3 is a detail in perspective of a rail-head insulation plate having the structural characteristic which distinguishes the same from an insulation plate of uniform thickness throughout.

Similar reference characters designate corresponding parts in the several figures of the drawings.

The improved insulation comprising the present invention is applicable to various kinds of rail joints, and hence available for use with fish plates, plain angle bars, angle bars of the continuous type, channel bars, or any of the divers forms of splices which connect the rails and extend across the joint between them. In any or all of these applications, the invention possesses the same utility and subserves the same functions.

For illustrative purposes, there is shown in Fig. 1 of the drawings an insulated rail joint including in its organization the usual rails R and splice bars 1 of the continuous type. These splice bars are associated with any suitable form of base insulation 2 to insulate the bars from the rail flanges, but the rail head insulation is of a novel and distinctive form. This rail-head insulation consists of an insulation angle-plate 3 of fiber, or other insulation material, fitting in the angle of the rail beneath the rail head and engaged by the head portion 4 of the splice bar. In contrast to the conventional insulation plate or fiber sheet, of uniform thickness throughout, the insulation plate 3 of above Fig. 1, is of non-uniform thickness. That is to say, this insulation plate is of graduated thickness, the same gradually increasing in thickness from its outer upper edge portion 5 toward its middle portion or angle 6 where it reaches a maximum thickness, and then from such point of maximum thickness, gradually diminishing in thickness toward its lower inner edge portion 7, hence, the improved insulation plate 3 is provided with a thickened intermediate angle portion 6 and with relatively thinner flange portions 5 and 7. The flange portion 5 is interposed between the under side of the rail head and the head portion 4 of the splice bar, while the depending flange portion 7 engages the web of the rail and may be provided in its lower edge with keeper notches 8 for engagement with the joint bolts, to secure the insulation against creeping.

A further feature of improvement embodied in the insulation plate 3, is the formation of said plate at one side with a convex, arcuate bearing surface 15 complementally related to the mating concave arcuate contact face 16 of the rail together with the formation of said plate at its other side with a concave arcuate bearing surface 9 complementally related to the mating convex arcuate contact face 10 formed upon the top and inside of the bearing head 4 of the splice, the concave bearing surface 9 having a greater radius than the convex bearing surface 15. It is by reason of this novel formation of bearing faces with the corresponding bearing faces on the rail and spliced bar, that the insulation will be compressed and its density and life increased by the tightening of the bolts or the pounding of the car wheels besides also increasing the working bearing faces. After the bolts have been tightened, the head 4 of the splice bars will become bedded more or less in the insulation as shown in dotted lines; but the characteristics of this invention still remain the same.

There is shown in Fig. 2 of the drawings, an angle bar splice having a similar conformation at its head to that shown on the continuous splice of Fig. 1, but applied to the commonly used insulation having uniform thickness throughout. This figure shows the splice bar after it has been drawn in by the bolts, the original position of the outer surface of the insulation being indicated by the dotted lines. From the peculiar conformation of the head 4 of the angle splice bar in conjunction with the conformation of the rail, it will be seen that this insulation under compression, is given the form of the specially prepared insulation shown in Fig. 3, and thereby having all of the characteristics of the latter.

When the splice bars are drawn in by the bolts and nuts, they will compress the insulation and on account of the peculiar conformation of the head of the splice bars, in relation to the conformation of the rail, they will compress the insulation and prevent it from flowing out at its extreme edges.

From the foregoing, it is thought that the construction and advantages of the improved insulating means will be apparent without further description, and it will be understood that changes in the form, proportion and minor details of construction may be resorted to without departing from the spirit or sacrificing any of the advantages of the invention.

I claim:

1. A rail-head insulating unit comprising an insulation plate of transversely crescent form.

2. A rail-head insulating unit comprising an insulation plate having a thickened middle portion of crescent formation in cross section.

3. A rail-head insulating unit comprising an insulation plate having a middle portion of greater thickness than its edge portions and having a concave arcuate face.

4. An insulated rail joint including an insulation plate crescent shaped in cross section, a rail having a bearing to coincide with the convex of the crescent and a joint bar head to correspond with the concave of the crescent.

5. An insulated rail joint including a rail having a concaved insulation bearing surface, insulation, and a splice bar having a convexed insulation bearing surface of greater convexity than the concavity of the rail.

6. An insulated rail joint including a rail having an outer concaved arcuate bearing surface, an insulation angle plate, and a splice bar having a head provided with an inside convex arcuate face of greater convexity than the arcuate face of the rail.

7. An insulated rail joint including a rail, an insulation angle plate, and a splice bar having a head whose bearing faces are disposed at non-uniform distances from the adjacent bearing faces of the railhead and rail-web, the maximum distance between said bearing faces of splice bar head and rail being adjacent to the juncture of the rail-head and rail-web.

In testimony whereof I hereunto affix my signature in the presence of two witnesses.

WILLIAM P. THOMSON.

Witnesses:
BENJ. WALHAUPTER,
KATHERINE MCNALLY.